Figure 5:
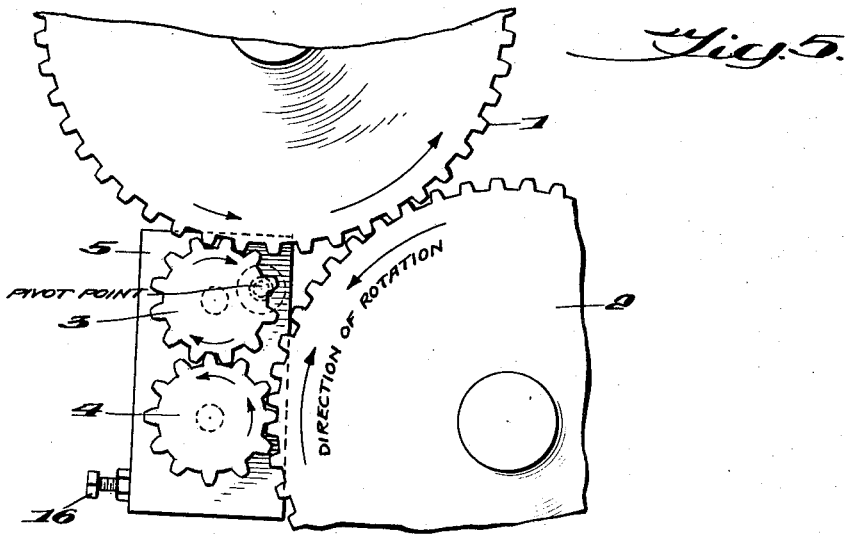

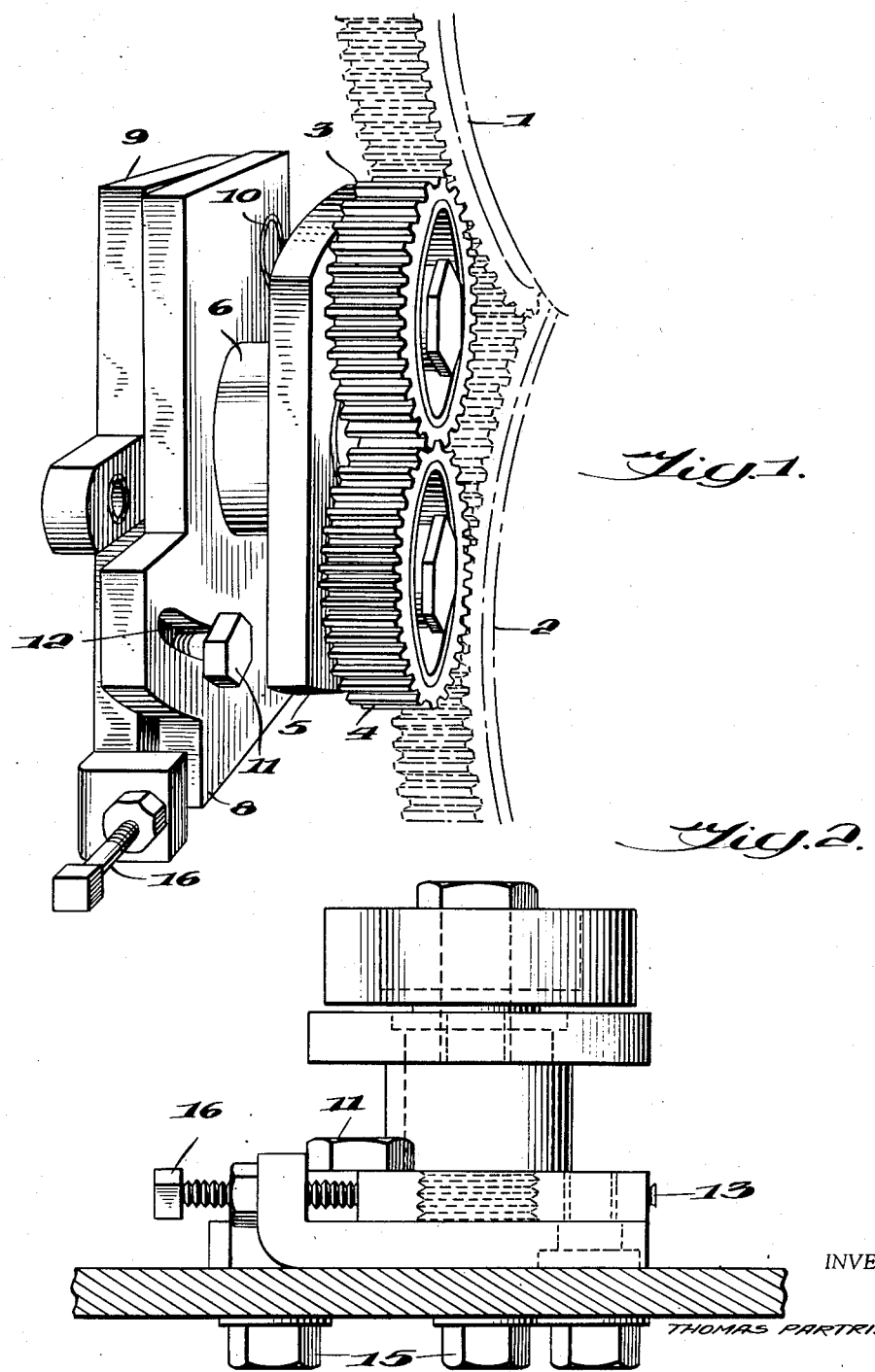

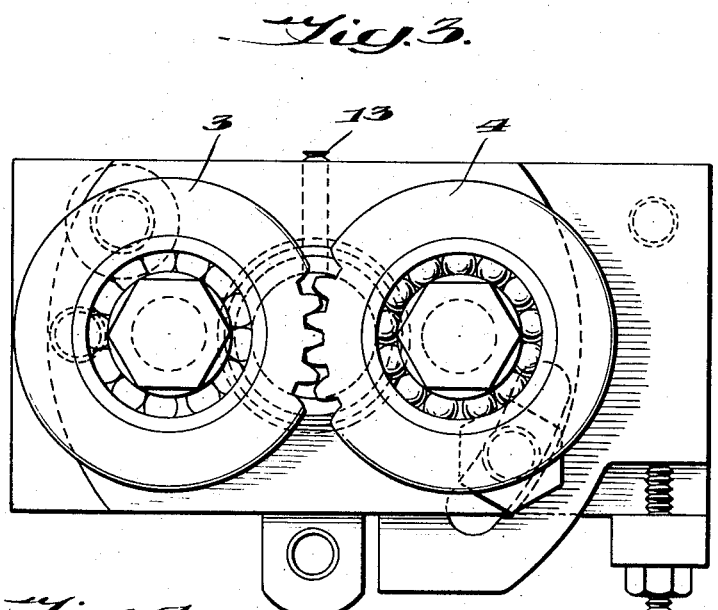
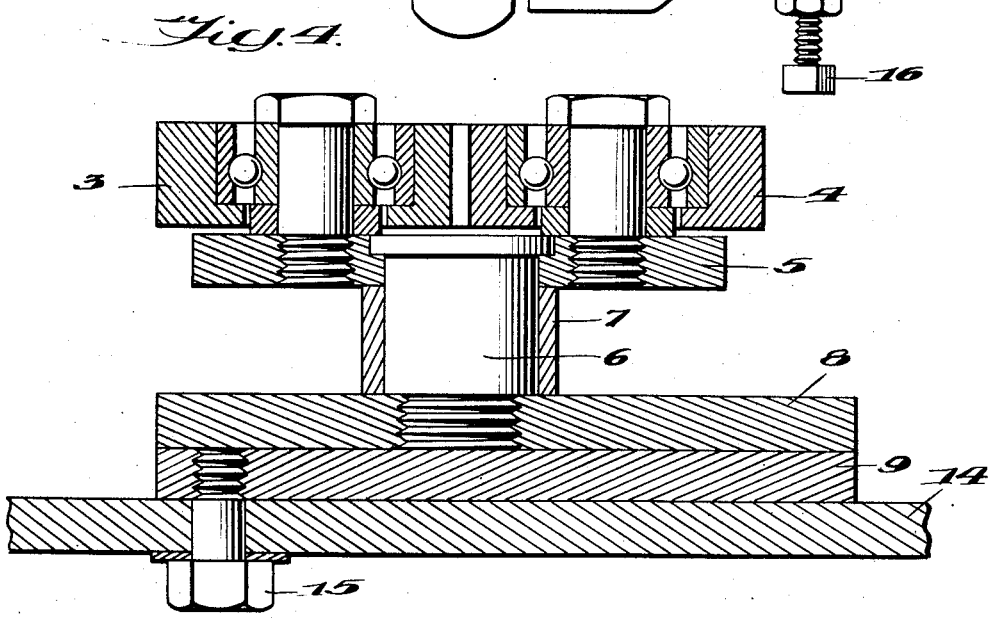

Oct. 22, 1957 T. D. PARTRIDGE 2,810,299
GEAR WEAR COMPENSATOR
Filed Feb. 13, 1956 3 Sheets-Sheet 3

INVENTOR
THOMAS PARTRIDGE,
BY Larson and Taylor
ATTORNEYS

United States Patent Office 2,810,299
Patented Oct. 22, 1957

2,810,299

GEAR WEAR COMPENSATOR

Thomas D. Partridge, Daytona Beach, Fla.

Application February 13, 1956, Serial No. 565,112

8 Claims. (Cl. 74—409)

This invention relates to a new and useful improvement in gear trains, the object of the invention being to provide a means of compensation for gear tooth wear between two or more mating gears of a gear train. A serious detrimental effect caused by gear tooth wear is increased backlash, which is defined as the free movement at the pitch circle of one gear of a gear train in the direction of the circumference. Considering one gear fixed and no allowance for varying clearance between the gears, backlash would be described as the play between the faces of the gear teeth. Specifically, then, the invention provides a means of obviating the detrimental effects caused by increased backlash.

A certain amount of backlash is always desirable and even necessary in any set of gears, but as wear removes more material from the face of the teeth, it is obvious that a more than desirable backlash will develop. Gear design today has justly become a highly complicated art, with the aim to develop more accurate, more durable, and less expensive machinery and power transmission equipment. For example, machine tools today contain gears to control feed rates, work rotation, tool rotation, and table drives. High cutting speeds involved with carbide tools have forced many manufacturers to use harder and more accurate gears. Control gears on ships, airplanes, and tanks are controlled by gear trains where backlash is held to the lowest possible limits, and where precise control of angular motion is required. In a control gear field of this nature, a worn out gear may be one whose thickness has been reduced by as small an amount as .0003 inch. Radar tracking equipment and automatic transmissions in automobiles have, for example, required new precision in gears unknown before.

Heretofore, gear wear has generally required immediate replacement of gears, resulting in expensive and excessive breakdown time and corresponding loss of efficiency in use of the equipment. Many manufacturers have made this even more serious by placing upper limits on backlash, generally permissible to the equivalent of one-tenth of the circular pitch. It is therefore obvious that in light of these requirements, it has become increasingly important to develop some way to reduce backlash as much as possible, and still extend the life of a normal set of gears.

One method of gear wear compensation has been developed and is often used, with varying degrees of success, depending on the application. This is generally described as gear splitting, and involves splitting one of the gears of a gear train longitudinally through its circumference. The split gears are then bolted together to form a full width gear, and by loosening these bolts and rotating one-half of the gear while the other remains stationary, a form of compensation is obtained. This method has the distinct disadvantage that after compensation adjustment has taken place, only one-half of the bearing surface of the gear tooth face is ever utilized.

The invention described herein accomplishes gear compensation in a distinctly different and new way. When wear develops between teeth of two main driving gears, a pair of supplementary gears is inserted in the drive and by varying the position of the supplementary gears, wear of the driving gears may be compensated for. The supplementary gears are, in effect, substituted for the driving gears and this not only decreases backlash but also supplies a new bearing surface for the gear train.

Essentially, however, the invention described herein has a distinct number of advantages over the split gear method. It permits much easier, more accurate adjustment; the full width gear tooth is utilized after adjustment; in most applications the gear wear compensation device described herein will be less costly than split gearing; more wear can be compensated for with this device than is practicable with split gearing; and finally, because of the ability to obtain accurate adjustment in the invention, wear compensation can be safely obtained without the danger of causing stiffening in a gear train due to insufficient backlash.

Figure 6:
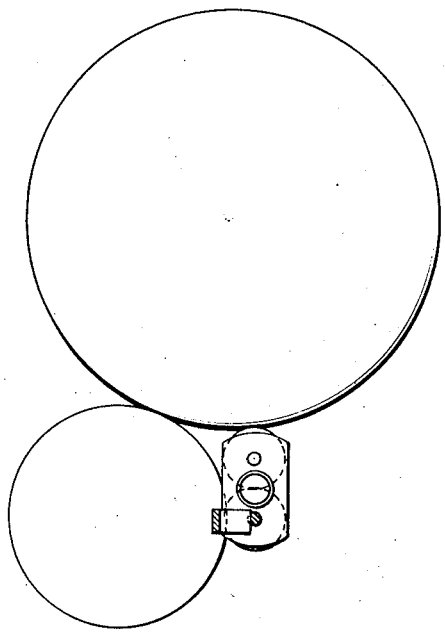
Figure 7:
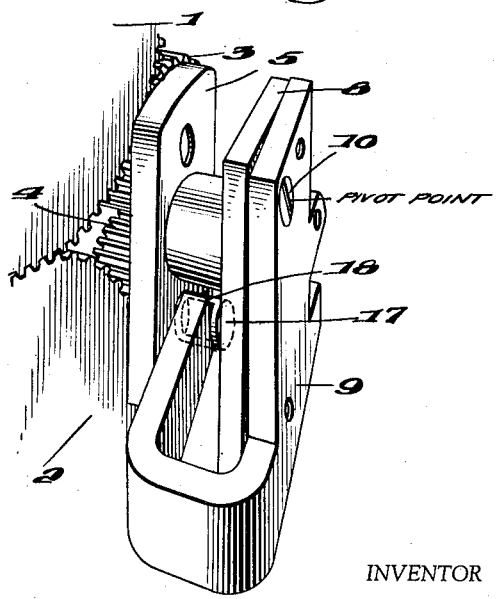

With the above important objects and advantages of the invention in mind, the main structure can be visualized essentially as shown in the accompanying drawings, wherein:

Fig. 1 is a perspective view of the invention;
Fig. 2 is a side view of the invention;
Fig. 3 is a plan view thereof;
Fig. 4 is a sectional view from the side, illustrating the mounting arrangement of the gears;
Fig. 5 is a schematic plan view showing the invention as applied to a gear train;
Figure 6 shows a rear view of a modification of the invention;
Fig. 7 shows a perspective view in detail of the modification.

The arrangement illustrated in these drawings represents a typical application of the gear wear compensator as applied to the gearing of the plate and blanket cylinders of a lithographic type printing press. The plate and blanket cylinders mounted on parallel axes, are commonly driven by two large mating gears, gears 1 and 2, shown in Figures 1 and 5. Gear 1 refers to the driven gear, and gear 2, to the driver gear, and constitutes those gears upon which compensation is to be applied. They will be referred to as the control gears.

Generally, the two mating gears will mesh perfectly and the angular or rotational velocity of the plate and blanket cylinders will be the same with respect to each other. However, this almost necessary and ideal condition will be lost when wear on the gear teeth occurs. With the increased backlash or play developed through tooth wear, it is obvious that there will no longer exist identical angular motion in the two rotating cylinders, and that while uniform angular velocity may be present in one of the cylinders, there will be far from uniform velocity in the other. The desirability of a smooth positive drive in a lithographic printing press is obvious, and any device which will take up the play will increase the efficiency of the press and the quality of the work.

It is the purpose of the gear wear compensator in this illustration to alleviate the undesirable condition developed through backlash. Referring to Fig. 1, gears 3 and 4 are two complementary gears which are used to accomplish this wear compensation. As can be seen, they are mating with each other, and with the two large spur gears 1 and 2 of the printing press. The numeral 5 refers to the complementary gear base upon which the two gears 3 and 4 are rotatably mounted. Fig. 4, being a cross-sectional view, clearly illustrates how the two complementary gears are mounted on the complementary gear base 5. The gear base freely revolves on the spindle bolt 6, supported by the spindle bolt collar 7. All of the above mechanism is attached to the pivot base 8 by means of the spindle bolt 6 as shown. The spindle bolt has been threaded to screw firmly down upon the pivot base. A spindle bolt set screw 13, shown in Figs. 2 and 3, is screw fitted within the base 8, and is provided to prevent the spindle bolt from working loose under operating conditions.

The pivot base 8, Fig. 1, is attached to a mounting base 9 which is rigidly mounted with respect to the pivot base by means of a pivot bolt 10, about which the pivot base is able to revolve relative to the mounting base. Thus the pivot base is free to move through a limited arc with the pivot bolt 10 as the center of the arc, and is held in position by the locking bolt 11 extending through the arc 12 cut in the pivot base 8.

The mounting base 9 is bolted to the side frame 14 of the press, one of the mounting bolts 15 being shown in Figs. 2 and 4. This mounting base 9 would probably be eliminated if the device were being incorporated into the press as originally manufactured, since the side frame casting of the machine could be utilized to take over the function of this part.

The angular position of the pivot base with respect to the mounting base is accomplished by means of the adjustment set screw 16 in combination with the lockbolt 11, which serves to lock the pivot base 8 in any desired angular position. The adjustment set screw has a lock nut to maintain its setting.

The device functions to compensate for gear wear in the following manner. Play is developed between the large control gears 1 and 2 through wear on the faces of the gear teeth. The complementary gears 3 and 4, base 5, and the pivot base 8 are so mounted that they are free to revolve about the pivot bolt 10, with continuous contact maintained between the complementary gears and their respective control gears. In this pivoting movement, there are two additional movements involved, namely, a rotation of the complementary gears, and rotation of the gear base 5.

Figure 5 clearly shows the mode of functioning of the compensator. This figure shows the control gears having teeth considerably worn so that excessive play exists between the driver and driven gears. This figure also shows the control gears in their compensated position, where no, or minimum, play results. Assuming that clockwise rotation exists in the driver gear 2, and counter clockwise rotation in the driven gear 1, wear has developed on the mating forward faces of the teeth of the driver gear and rear faces of the teeth of the driven gear. This would essentially allow the driven gear to drop back rotationwise with respect to the driver gear, and in addition would increase the amount of free space between the mating gear teeth, or, in other words, would increase backlash. In compensation, it is desirable to (1) advance rotationwise the driven gear, to its original relationship with respect to the driver gear 2, and (2) to decrease backlash. This is accomplished by rotating the complementary gears and changing their positions relative to the control train in the manner disclosed below, such that the driven gear is rotationally advanced relative to the driver gear, and such that the complementary gear train now assumes the driving function. Figure 5 shows the gears in their new relationships. It now shows driver gear 2 driving gear 4, which in turn is driving gear 3, which is now driving the driven gear 1. Thus the teeth of the complementary gear train have completely assumed the mating function of one of the faces of the teeth of the control train and now substitute the fresh bearing surfaces of the complementary gear teeth for the worn bearing surfaces of the original driving train. Figure 5 also shows the gears 1 and 2 positioned so that there is little or no play between the rear faces of the driver teeth and the forward faces of the driven teeth. Thus where prior to compensation the opposite teeth faces were mating or adjacent to each other, one can now see that gear 1 has been advanced counter clockwise, driver gear 2 remaining stationary, to its original position with respect to driver gear 2. One can also see the new gear train in a locked relationship or in a relationship where little or no play exists. Holding driver gear 2 stationary, one can see analysing the force components in the train, that the driven gear 1 will also be immovable.

This compensation is accomplished in the following manner. The locking bolt 11 is loosened, and the pivot base 8, bearing the gear base 5, and gears 3 and 4, is pivoted inwards about the pivot point 10, toward the driver and driven gears, by means of the adjustment set screw 16.

Still assuming that the driver gear 2 will remain stationary, the pivoting action carrying gears 3 and 4 in towards the driver and driven gears will cause (1) the complementary gear 3 to epicyclically move around the gear 1; (2) the complementary gear 4 to tend to epicyclically move around the gear 2; (3) both gears to tend to exert positive thrust forces on the control gears in the direction of their physical movements. All these forces will balance out and result in a vector component, which, due to the greater arc length traveled by the complementary gear 4 as compared to the complementary gear 3, will cause the driven gear 1 to actually move in a counterclockwise direction.

Normally, because of the mechanics of the situation, compensation would not be carried out to the extent shown in Figure 5. Adjustment of the set screw would be such as to allow some play in the gear train. It can also be seen that since the relationship between the supplementary gearing and the control gearing can be varied at will, and locked in any desired position to exert any amount of pressure desired, within the restrictions imposed by the mechanics of the installation (i. e., a certain amount of backlash or play is necessary), the device gives a positive takeup, or compensation for almost any amount of wear in the control gears.

Two other features of this device are evident, one being that it is equally as effective when the rotation of the control gears is in the opposite direction. Here, however, the supplementary gear train will take over the function of the free faces of the control gears, rather than the bearing surfaces, during rotation, and will thus effect a decreased amount of backlash. Second, the gear wear compensator is equally effective even after wear occurs in the complementary gears, since varying the relationship between the two trains can be made to take up wear even here. Two essential requirements would be that enough adjustment be left in the pivot base so that the driver gear 2 can be returned to its original position relative to the driven gear, before wear began, and that enough thickness remain in the gear teeth to offer sufficient structural support during operation. Finally, it can be seen that compensation can be affected when gear 1 is the driver gear and gear 2 the driven gear. Here again it can be seen that the supplementary train would take over the function of the free faces of the gear teeth to decrease backlash.

It is understood that a certain number of equivalents are within the purview of the invention in addition to the above described specific embodiments. The same device could be applied to worm gears, internal spur gears, bevel gears, hypoid gears, helical gears, and face gears in addition to spur gears. It can also be applied to any number of spur gears or to any number of the above described gears. For example, if three spur gears were to be controlled, a train of three idler gears would be employed for wear compensation. If the train to be controlled consists of an uneven number of gears, the complementary train would contain an uneven number of gears, greater than one, so that the direction of rotation of the complementary gears would be correct to tie in with the control train.

It will also be understood that one skilled in the art could attach certain refinements, such as a micrometric adjustment scale to the wear compensator adjustment means. It is also likely that the train could be altered to eliminate the mounting base, and attached directly to the frame of the machine.

One very important refinement to the invention might be as follows. Referring to Figure 7, a pin 17 is installed, extending from the lower surface of the gear base 5. The preferable location of the pin would be extending down from the lower left hand side or middle of the gear base 5 in Fig. 1. This pin would be in constant contact with a fixed cam surface 18, having the same surface contour as the driver gear 2, and located concentric with the driver gear but in a parallel plane; i. e., the cam surface is a circular arc having as a radius the distance between the cam face and the center of the control gear 2. This cam would be attached rigidly to the press frame or could be part of the mounting base 9 as shown, namely as a U-shaped arm or extension from the mounting base. In this way the cam surface would be rigidly fixed with respect to the press frame and driver gear. The purpose of the refinement would be to supply a fixed reference for movement of the gear base. As the pivot base 8 is pivoted in towards the fulcrum of the control gears, the action of the gear base 5 would be controlled by the pin and cam arrangement described above. Its most important function will be to afford protection from direct center to center line thrust between the supplementary gears and their respective mating control gears. It will cause the mating, complementary and control gears to move tangential to each other, rather than in opposing center to center line directions.

It should be noted that spur gears are generally designed for 99% efficiency, and that the addition of the complementary gears for gear wear compensation will not appreciably alter the spur gear efficiency.

It is believed that the advantages and use of the invention will be readily understood from the foregoing disclosure and accordingly, further description at this point is deemed unnecessary.

What is claimed as new and desired to be secured by Letters Patent is:

1. A gear wear compensator for a control gear train, comprising a complementary gear train, and means for varying the position of the complementary gear train as a unit relative to the control train, such that the complementary gear train completely assumes the mating function of one of the faces of the gear teeth of the control train.

2. A gear wear compensator for a control gear train, comprising a complementary gear train, a single rigid gear base carrying the gears of said complementary gear train, and means for varying the position of the complementary gear train as a unit relative to the control train, such that the complementary gear train completely assumes the mating function of one of the faces of the gear teeth of the control train.

3. A device according to claim 2, wherein the complementary gear train is provided with at least two gears which mesh with driver and driven gears respectively of the control train.

4. A gear wear compensator for a control gear train, comprising a complementary gear train, a single rigid gear base bearing the gears of said complementary gear train, a pivot base upon which the rigid gear base is rotatably mounted and supported, and means for adjusting the position of the pivot base whereby the complementary gear train as a unit shifts in position relative to the control gear train, and completely assumes the mating function of one of the faces of the gear teeth of the control train.

5. A device, according to claim 4, including a mounting base, the pivot base being pivotably mounted upon said mounting base, and further including means for attaching said mounting base to a machine member bearing the control gears.

6. A device according to claim 4, and further including means for attaching the pivot base directly to a machine member bearing the control gears.

7. A gear wear compensator for a control gear train, comprising a complementary gear train, the first and last gears of said complementary gear train meshing with the first and last gears of said control gear train, and means for epicyclically changing the position of said complementary gears relative to said control gears and at the same time rotating said complementary gears relative to said control gears, such that the teeth of the complementary gears assume the mating function of one of the faces of the gear teeth of the control train.

8. A gear wear compensator as claimed in claim 7 and further comprising means fixedly mounted relative to said control gears co-acting with said first named means to prevent radial thrust of said complementary gears against said control gears.

References Cited in the file of this patent
FOREIGN PATENTS

| | | |
|---|---|---|
| 633,971 | Great Britain | Dec. 30, 1949 |
| 662,056 | Great Britain | Nov. 28, 1951 |
| 855,787 | Germany | Nov. 17, 1952 |
| 910,033 | France | May 24, 1946 |